(12) United States Patent
Wallace

(10) Patent No.: US 6,335,576 B1
(45) Date of Patent: *Jan. 1, 2002

(54) REMOTE KEYLESS ENTRY RECEIVER HAVING CORRECTLY MATCHED TRANSMITTERS

(75) Inventor: Mark D. Wallace, White Lake, MI (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 26 days.

(21) Appl. No.: 09/260,222

(22) Filed: Mar. 1, 1999

(51) Int. Cl.$^7$ .............................................. B60R 25/00
(52) U.S. Cl. ..................................................... 307/10.2
(58) Field of Search .............................. 307/10.1, 10.2, 307/10.3–10.6

(56) References Cited

U.S. PATENT DOCUMENTS 4,881,148 A * 11/1989 Lambropoulos et al. .... 361/172
5,635,923 A * 6/1997 Steele et al. ................. 340/905

* cited by examiner

Primary Examiner—Fritz Fleming
(74) Attorney, Agent, or Firm—Tarolli, Sundheim, Covell, Tummino & Szabo L.L.P.

(57) ABSTRACT

Vehicle mounted apparatus is presented for use in a remote keyless entry system for controlling access to a vehicle. The apparatus receives access request signals from a plurality of remote transmitters wherein each received access request signal includes a security code that uniquely identifies an authorized transmitter as distinguished from other transmitters and an associated model type code that identifies a vehicle model type associated with the transmitter. A memory stores a plurality of security codes each representing an authorized transmitter and stores a model type code that identifies the vehicle's model type. Means are provided for initiating programming periods. Circuitry responds during a programming period for determining whether a received model type code matches the stored model type code and, if so, then storing the associated security code in said first memory means for subsequent evaluation during a non-programming period of a received security code with the stored security code for allowing access into the vehicle.

7 Claims, 3 Drawing Sheets

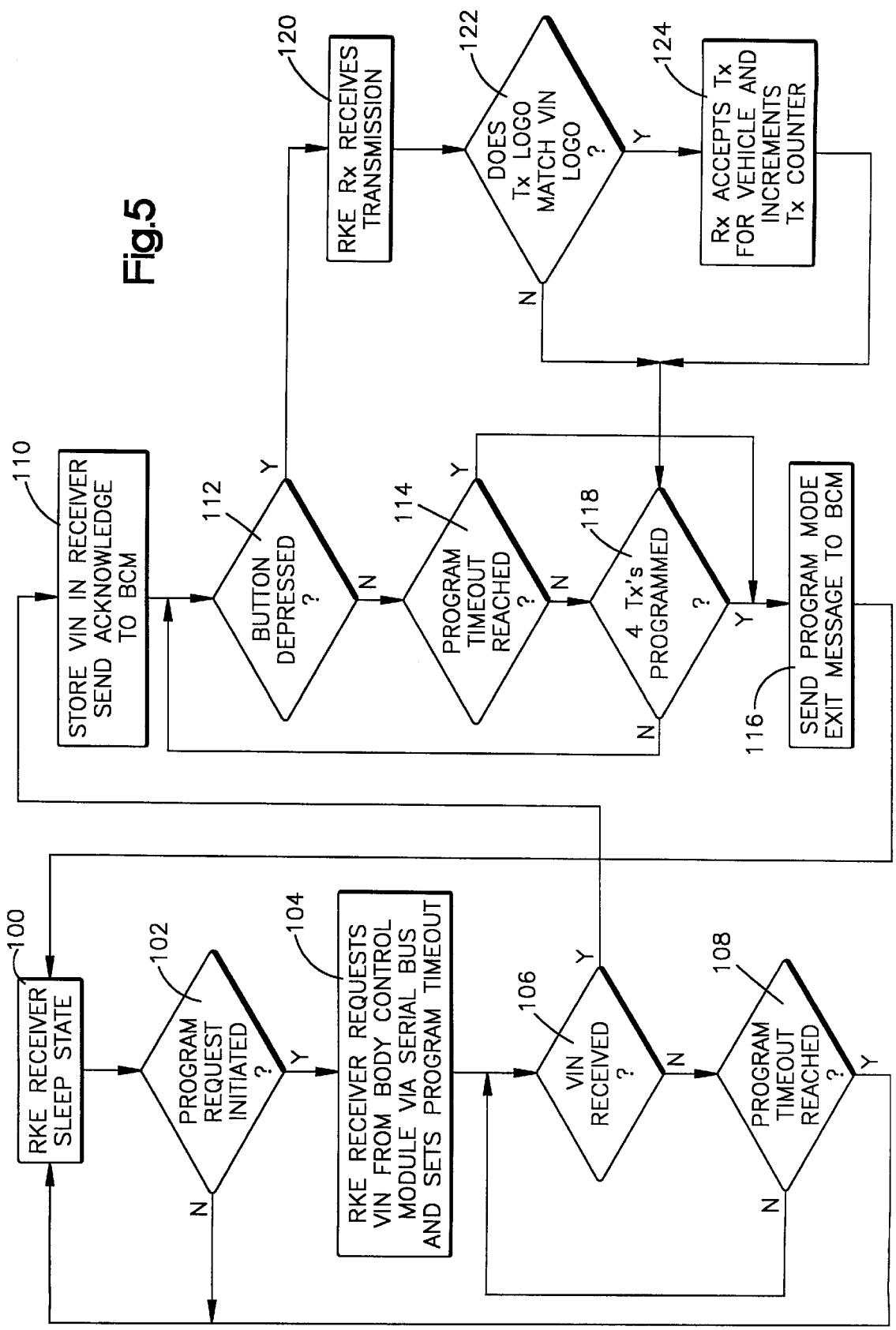

REMOTE KEYLESS ENTRY RECEIVER HAVING CORRECTLY MATCHED TRANSMITTERS

FIELD OF THE INVENTION

The present invention relates to the art of remote keyless entry systems and, more particularly, to improvements for assuring correct matching of vehicle model type indicators or logos on transmitter housings with a vehicle mounted receiver.

DESCRIPTION OF THE PRIOR ART

Remote keyless entry (RKE) systems are known in the art for controlling the locking and unlocking functions of a motor vehicle door lock. Such systems include a receiver mounted in a motor vehicle and a portable hand-held transmitter located remote from the receiver. The receiver has a memory that stores one or more security codes, each of which identifies a transmitter that is authorized entry into the vehicle. Each transmitter is provided with one or more manually actuatable switches, each representative of a vehicle control function to be performed, such as the unlocking of a vehicle door. The transmitter includes circuitry that responds to the actuation of one of the switches to transmit a digital signal that includes a security code which uniquely distinguishes the transmitter from a plurality of similar transmitters and a function code representative of the control function to be performed. When the receiver receives such a digital signal, it compares the received security code with each stored security code to determine whether the received security code was transmitted by an authorized transmitter. If a match takes place, the receiver responds to the function code by causing performance of the control function requested, as by unlocking a vehicle door. A system as described above is disclosed in the U.S. Patent to Lambropoulos, et al. 4,881,148, the disclosure of which is herein incorporated by reference.

Automotive manufacturers make many different motor vehicle model types. For example, Chrysler Corporation makes Chrysler vehicles, Jeep vehicles as well as Dodge vehicles. A division of an automobile manufacturer may also manufacture different vehicle model types. Thus, for example, the Pontiac division of General Motors Corporation manufactures Firebird vehicles and Sunbird vehicles.

The various vehicle model types noted above employ different corporate logos which are visually different from each other. During vehicle assembly, several vehicle model types may be assembled at the same facility. Frequently, these vehicles are equipped with remote keyless entry (RKE) systems. It is typical for such a manufacturer to provide the RKE transmitter with a visually distinctive logo on the transmitter housing so that this logo identifies a particular model type that is to be associated with the transmitter. Because several model types may be manufactured at the same facility, a concern exists that the assembly operation will mis-match the transmitters with the wrong vehicles. For example, an RKE transmitter housing having the Jeep logo thereon may be mis-matched for use with a Dodge vehicle. This mis-matching would take place when the RKE receiver in such a vehicle is being programmed to enter into it's memory the security codes that identify authorized transmitters for use in gaining access into the vehicle.

SUMMARY OF THE INVENTION

In accordance with the present invention, an apparatus is mounted in a vehicle for use in a remote keyless entry (RKE) system for controlling access to the vehicle. The apparatus includes circuitry for receiving access request signals from a plurality of remote RKE transmitters wherein each received access request signal includes a security code that uniquely identifies an authorized transmitter as distinguished from other transmitters and an associated model type code that identifies a vehicle model type associated with the transmitter. A memory stores a plurality of security codes each representing an authorized transmitter and also stores a model type code that identifies a vehicle model type. Apparatus is provided for initiating programming periods. Circuitry responds during a programming period for determining whether a received model type code matches the stored model type code and, if so, the associated security code is stored in the memory for subsequent evaluation during a non-programming period of a received security code with the stored security code for allowing access into the vehicle.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and wherein:

FIG. 5 is a flow diagram illustrating the operation of the receiver employed herein.

DESCRIPTION OF THE PREFERRED EMBODIMENT

Reference is now made to the drawings wherein the showings are for the purposes of illustrating a preferred embodiment of the invention only, and not for the purposes of limiting same. The remote keyless entry (RKE) system described herein may include one or more remote, portable transmitters which communicate with a vehicle receiver to achieve remote control of the vehicle's door lock mechanism. The portable transmitters include transmitters A and B. Each transmitter, sometimes known as a fob, may take the form of transmitter T illustrated and described in the U.S. patent to Lambropoulos, et al. 4,881,148 which disclosure is herein incorporated by reference.

Each remote transmitter A and B is assigned a security code unique to the particular transmitter. Each vehicle receiver C is mounted on a vehicle V (indicated by the dotted lines in FIG. 1) and will permit entry into the vehicle of an operator carrying a transmitter that is coded with the proper security code. The receiver C may take the form of the receiver illustrated and described in the U.S. Patent to Lambropoulos, et al. 4,881,148. In the example being given herein, transmitters A and B are provided with security codes SC-A and SC-B, respectively, which will permit entry into the vehicle in which is mounted receiver C. The receiver C has a normal mode of operation during which it receives from a portable transmitter, such as transmitter A or B, a signal S including a security code that uniquely identifies the transmitter together with a function code requesting a particular vehicle device operation, such as unlocking of a vehicle door. The receiver includes a microcontroller and has a memory that stores one or more security codes each of which uniquely identifies a transmitter that is authorized entry into the vehicle. If the received signal includes a coded portion that matches the stored security code, then the receiver initiates action to perform the commanded vehicle function, such as a vehicle door unlock function.

Figure 1:
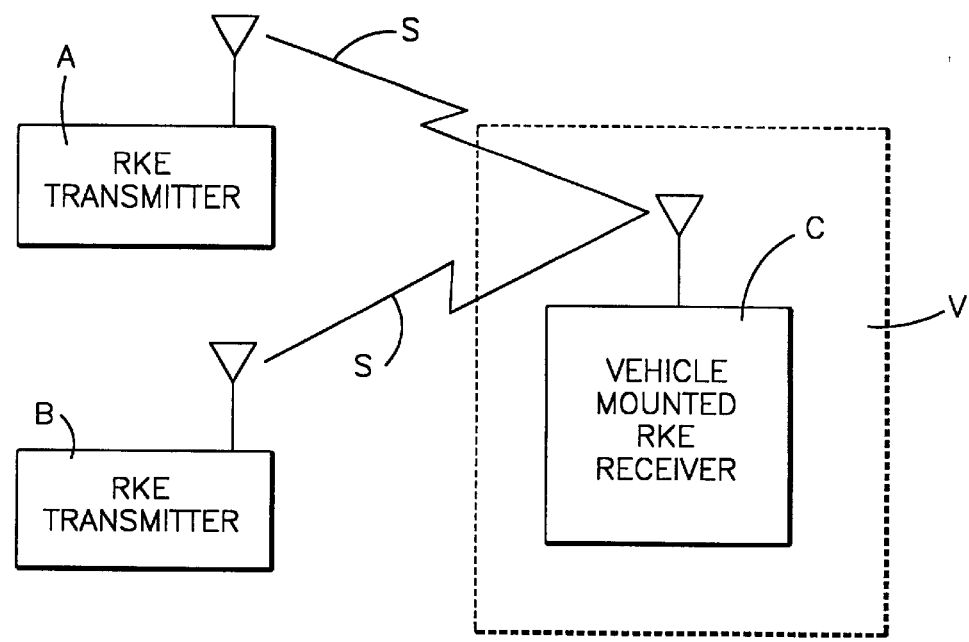
FIG. 1 is a block diagram illustrating a pair of portable RKE transmitters communicating with a vehicle mounted receiver.
Figure 2:
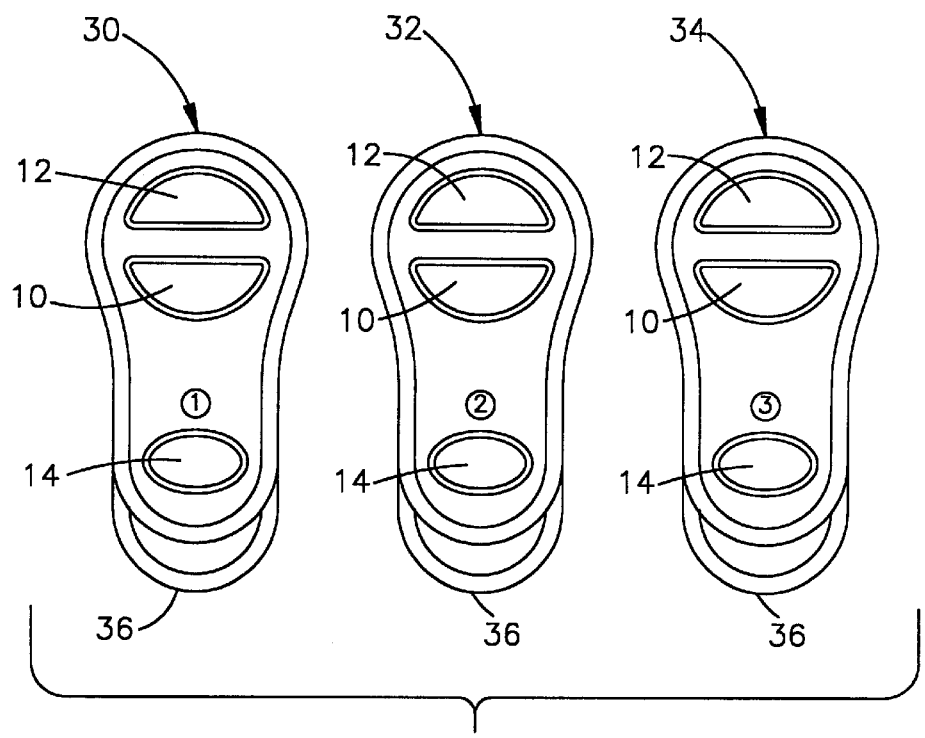
FIG. 2 is a graphical illustration of three RKE transmitter housings.
Figure 3:
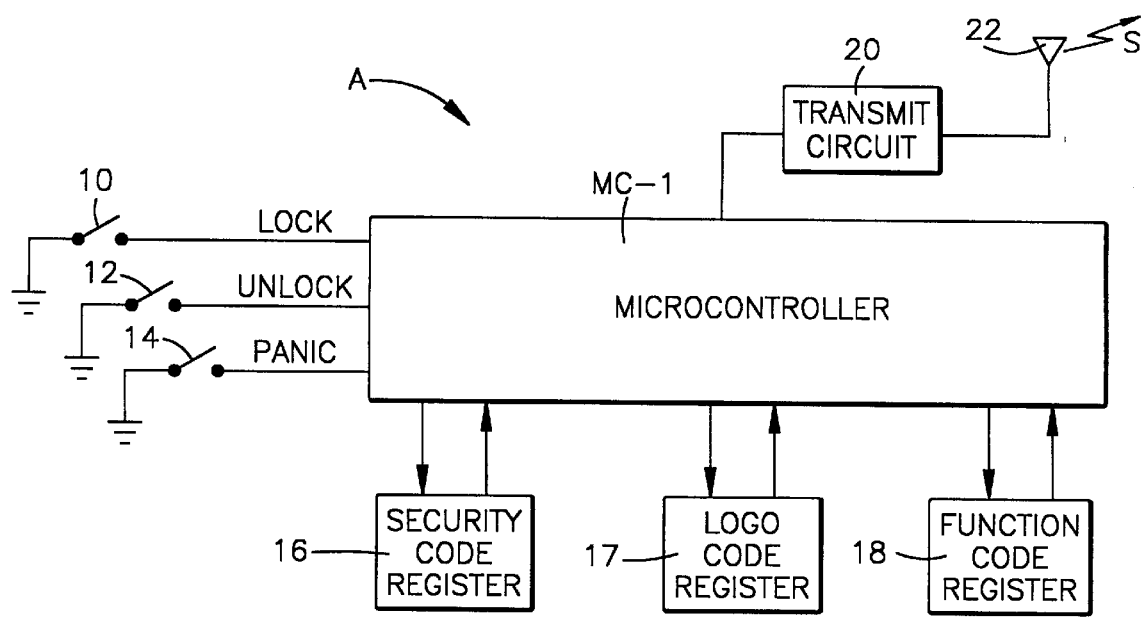
FIG. 3 is a block diagram illustration of the circuitry included in each RKE transmitter.

Each portable transmitter takes the form of transmitter A, illustrated in FIGS. 1, 2 and 3. This transmitter includes a microcontroller MC-1 having appropriate internal ROMs, EEPROMs and RAMs programmed to perform the functions of the system, as described herein, and having sufficient I/O terminals for interconnection with input and output peripherals. The transmitter includes a plurality of manually operable switch buttons 10, 12 and 14. In response to the actuation of one of the switch buttons, the microcontroller in the transmitter controls the transmitter to transmit a digital signal S. This is preferably a radio frequency (RF) signal having a carrier frequency of 315 MHz. The digital code in the signal is binary with a binary one and a binary zero being distinguished from each other by a difference in length or duration. The digital signal S includes a security code and a function code.

The security code uniquely identifies the transmitter A and thus distinguishes it from other, similar transmitters. The receiver C may permit several selected transmitters to have valid entry into the vehicle. These may include, for example, transmitters A and B. Only transmitter A is illustrated herein, but transmitter B is identical, except for its security code. The security code is fixed in the memory associated with the microcomputer in the transmitter at the time of manufacture and may be accomplished in the manner described in U.S. Pat. No. 4,881,148. A similar security code is provided in the memory associated with the microcomputer in transmitter B.

The function code is transmitted as part of the transmitted signal S from the transmitter A to the vehicle mounted receiver C. This function code preferably takes the form multi-bit, coded byte with the bits being arranged to represent the function being requested, such as "unlock the vehicle door".

Each transmitter includes a controller taking the form of a microcontroller MC-1. The transmitter includes a security code storage register 16 which stores the security code SC-A (for transmitter A). Also, the transmitter includes a register 18 which stores the various function command codes associated with various keypad switch buttons, to be described hereinafter. When a digital signal S is transmitted to the receiver C, data is supplied to transmit circuit 20 which then transmits the signal by way of an appropriate antenna 22.

Reference is now made to FIG. 2 which illustrates three RKE transmitter housings 30, 32 and 34. Each housing includes the transmitter circuitry illustrated in FIG. 3. The main difference between the circuits found in each housing is that each has a different security code stored in the security code register 16. Each housing carries a lock push button 10, an unlock push button 12, and a panic push button 14 (for causing an alarm to sound when this push button is actuated). Each housing may be supplied with a keyring 36 to which an operator's ignition key may be secured in a known manner.

The housings 30, 32 and 34 may be constructed of plastic or the like. It is common for an original equipment manufacturer (OEM) to form a distinguishing corporate logo on the transmitter housing. The logo may be a graphic design or it may be a word. For example, Chrysler Corporation employs a star configuration as a logo to designate Chrysler vehicles. This corporation also provides a logo taking the graphical form of a ram to designate Dodge vehicles. Also, this corporation employs the word Jeep as a logo to designate Jeep model types. Thus these various logo's identify different vehicle model types and, in the example being presented herein, LOGO 1 on housing 30 may represent a Chrysler star to identify a Chrysler vehicle model type. LOGO 2 may be a graphical configuration of a ram to designate a Dodge vehicle model type. LOGO 3 on housing 34 may take the form of the word JEEP to designate a Jeep vehicle model type.

During the installation of a remote keyless entry system at an assembly plant or at a vehicle dealer facility a mis-match of a particular vehicle and an RKE transmitter should not occur. For example, if an RKE transmitter is to be used with an RKE receiver mounted in a Jeep vehicle, then an RKE transmitter having a housing 34 with a JEEP logo should be employed. If not, a mis-match will take place.

It is contemplated that each transmitter, as shown in FIG. 3, will include a logo code register for storing a logo code that correctly identifies the vehicle model type indicated by the logo on the housing. This takes the form of a four bit code stored in register 17. The microcontroller MC-1 is programmed so that in response to closure of any of the function request switches 10, 12 or 14, a signal is transmitted. This signal includes security code identifying the transmitter along with a function code, determined by which of the switches has been closed, and a logo code that identifies the vehicle model type associated with the transmitter. In the example presented it is contemplated that each transmitter for the same vehicle model type will transmit the same logo code. Thus, for example, the code 0000 may be used to designate all Chrysler vehicles, the code 0001 may be used to designate all Dodge vehicles, and the code 0010 may be used to designate all Jeep vehicles. Thus, all transmitters that are employed for designating Jeep vehicles will have the logo code 0010 stored in the logo code register 17. The transmitters in this group will each have a different security code in the respective security code registers 16.

Figure 4:
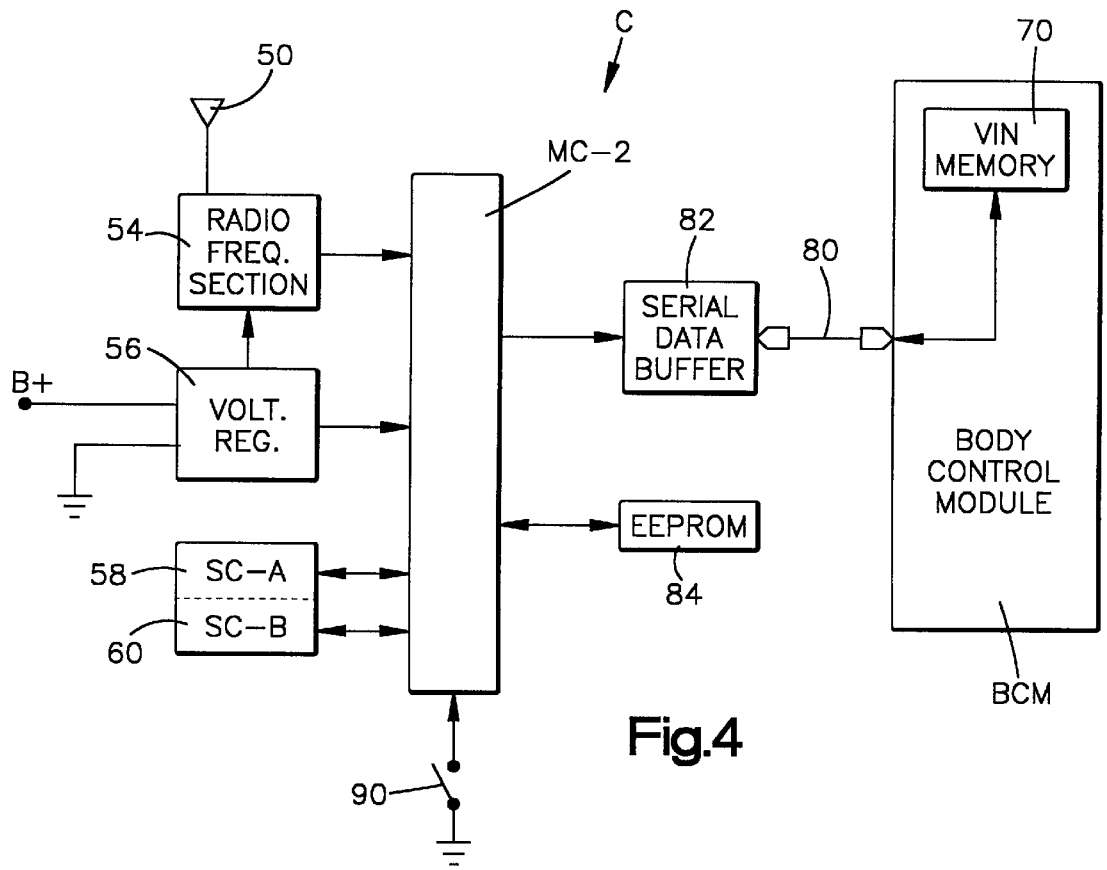
FIG. 4 is a block diagram illustration of the circuitry within the vehicle mounted RKE receiver connected to a body control module.

Reference is now made to FIG. 4 which illustrates the circuitry in a vehicle mounted RKE receiver C in greater detail. The receiver includes a receiving antenna 50 which communicates with a microcontroller MC-2 by way of a radio frequency section 54. Power is supplied to the radio frequency section and the microcontroller from a voltage regulator 56 which is connected to the vehicle battery or a suitable voltage supply source B+. The microcontroller MC-2 includes a plurality of internal memories including ROMs, EEPROMs, and RAMs. For illustration purposes FIG. 4 illustrates memory registers 58 and 60 which respectively store security codes SC-A and SC-B that uniquely identify authorized transmitters A and B, respectively, which may gain access to the vehicle in which the receiver C is mounted. It is contemplated that the vehicle in which the receiver C is mounted contains a body control module (BCM) having a memory 70 which stores the vehicle identification number (VIN). This VIN number identifies the vehicle model type of the vehicle V in which the receiver C is mounted. Thus, for example, the VIN information may identify the vehicle model type as being a Jeep, logo code 0010. The RKE receiver C, when installed in the motor vehicle V, will be connected to the body control module (BCM) by way of a bi-directional serial communications link 80 and a serial data buffer 82.

In accordance with the present invention, the receiver C is also provided with a memory 84, which may take the form of an EEPROM for storing the VIN number when obtained from the VIN memory 70. A programming period for entering security codes into the vehicle receiver memories 58 and 60 is initiated as by an operator closing a switch 90 which is in communication with the microcontroller MC-2.

During the assembly of the receiver C in the vehicle at an assembly facility or at a dealer facility, a technician will program the receiver to store the security codes of the authorized transmitters that are to have access to the vehicle. Programming periods are initiated by closing a switch 90. As will be described in greater detail hereinafter, the microcontroller MC-2 is programmed to respond to closure of switch 90 to request the VIN number stored in the VIN memory 70 and store this number in memory 84 during the programming period. The VIN number will include the four bit coded portion that identifies the vehicle model type of vehicle V.

During the programming period (which may be 30 seconds long) the technician will depress one of the switch buttons 10, 12 or 14 on each transmitter that is to be authorized to have access into the vehicle. The transmitter transmits its security code along with a function code, dependent on which of the function buttons 10, 12 or 14 was actuated. The function code is ignored and the security code is stored in a register, such as register 58, as a first security code (SC-A). A second security code (SC-B) may be entered for storage in register 60 in response to the technician actuating the function push button switch 10, 12 or 14 for a second transmitter to be authorized. In this example, up to four transmitters may have their security codes stored during a programming period (this requires four registers but only two registers 58 and 60 are shown for simplification).

In accordance with the present invention, the programming of security codes into the vehicle receiver takes place only after a determination is made that the vehicle model type code in the VIN number stored in the memory 84 matches the model type code transmitted as a portion of signal S received from the transmitter during the programming period. If a match takes place, the security code for that transmitter is then stored in the receiver memory, such as in register 58. During a subsequent non-programming interval, the stored security code may be compared with a received security code and, if a match takes place, the requested vehicle function, such as UNLOCK DOOR, will be performed.

Reference is now made to FIG. 5 which illustrates a flow diagram showing how the microcontroller MC-2 in the vehicle receiver is programmed in accordance with the present invention. Initially, the RKE receiver is in a "sleep" state, as indicated by step 100, waiting for initiation of a programming period. The programming period is initiated as a result of a technician actuating the program switch 90 in preparation for programming the RKE receiver to store security codes representing transmitters that are authorized entry into the vehicle V.

In step 102, a determination is made as to whether such a program request is initiated. If not, the procedure reverts to the sleep state step 100. If a program request is initiated, then in accordance with step 104 the RKE receiver C requests the vehicle identification number (VIN) from the body control module (BCM) by way of the serial bus 80 and sets a program time out of the program period, such as thirty seconds. It is during this programming period that a determination is made as to whether the logo representing the model type code of the transmitter matches the model type code obtained from the VIN memory 70. If so, the security code for that transmitter is stored in memory. During the thirty second time period up to four transmitters may be programmed in this matter.

In step 106, a determination is made as to whether the vehicle identification number (VIN) has been received from the body control module. If not, a determination is made at step 108 as to whether the program period has timed out. If so, the procedure reverts to the sleep state at step 100. If the program period has not timed out, then step 106 is repeated.

If the VIN number has been received, the procedure advances to step 110 wherein the VIN number is stored in the memory 84 (FIG. 4) of the receiver and an acknowledgement thereof is sent to the body control module (BCM) by way of the serial communication link 80. At this point, the receiver is ready to be programmed and is waiting for one of the push button switches 10, 12 or 14, on a selected transmitter, to be actuated. Whether one of the push button switches has been actuated is determined at step 112. If such a switch button has not been actuated, the procedure advances to step 114 which determines whether or not the program period has expired (the thirty second time period). If it has, the procedure advances to step 116 at which a program mode exit message is forwarded to the body control module (BCM) and the RKE receiver returns to the sleep mode at step 100.

If in step 114 a determination is made that the program period has not timed out, the procedure advances to step 118 during which a determination is made as to whether four transmitters have been programmed during the programming period. If not, the procedure returns to step 112 waiting for a switch button on one of the transmitters to be actuated. If four transmitters have been programmed during the programming period, the procedure advances to step 116 in a manner as discussed above.

If the determination at step 112 is affirmative, the procedure advances to step 120 during which the RKE receiver C receives the transmission from the transmitter at which the switch button was actuated.

The procedure then advances to step 122 during which a determination is made as to whether the transmitter logo (vehicle model type code) received from the transmitter matches the stored model type code (VIN number) stored in the memory 84.

If a match is not obtained at step 122, the procedure advances to step 118 and a determination is made as to whether four transmitters have been programmed. If not, the procedure returns to step 112 waiting to determine whether one of the switch buttons on a transmitter has been actuated.

If the determination at step 122 is affirmative, this means that the model type code associated with the transmitter that sent the message being evaluated matches the model type code (VIN number) stored in memory 84. The procedure now advances to step 124 for the programming of the transmitter into the receiver. That is, the security code SC-A received from transmitter A being evaluated may now be stored in the register 58. A second security code SC-B from transmitter B may be stored in the same manner in the register 60. Although only two registers 58 and 60 are shown for storing security codes SC-A and SC-B it is to be appreciated that four registers will be required if four transmitters are programmed to the receiver during the programming period. Once the programming period has timed out or a maximum of four transmitters have been programmed, the programming operation will terminate.

During a subsequent non-programming period the receiver C may receive a message from a remote transmitter. This message will include a security code, such as security code SC-A or SC-B, together with a function code requesting a particular vehicle function such as unlock the vehicle drivers door. Before performing the function the vehicle receiver compares the received security code with the stored security code (in registers 58 and 60) and if a match takes place the vehicle function requested (unlock the drivers door) will be performed.

From the above description of the invention, those skilled in the art will perceive improvements, changes and modifications in the invention. Such improvements, changes and modifications within the skill of the art are intended to be covered by the appended claims.

Having described the invention, I claim:

1. Apparatus adapted to be mounted in a vehicle for use in a remote keyless entry system for controlling access to said vehicle, said apparatus comprising:

means for receiving access request signals from a plurality of remote transmitters wherein each received access request signal includes a security code that uniquely identifies an authorized transmitter as distinguished from other transmitters and an associated model type code that identifies a vehicle model type associated with the transmitter;

first memory means;

second memory means that stores a model type code that identifies said vehicle's model type;

first means for initiating programming periods;

second means responsive only during a said programming period for determining whether a received model type code that is received during said programming period matches the stored model type code and, if so, then during the same said programming period storing the associated received security code in said first memory means for subsequent evaluation during a non-programming period of a received security code with the stored security code for allowing access into said vehicle in accordance with said evaluation.

2. Apparatus as set forth in claim 1 wherein said first means includes a manually actuatable switch.

3. Apparatus as set forth in claim 1 wherein said second means includes means for timing each said programming period.

4. Apparatus as set forth in claim 1 including means for determining whether up to N access request signals have been received during said programming period.

5. Apparatus as set forth in claim 4 including a third memory means that stores vehicle information including said model type code.

6. Apparatus as set forth in claim 5 including means responsive to said first means initiating a said programming period for obtaining said stored model type code from said third memory means and storing said stored model type code in said second memory means.

7. Apparatus as set forth in claim 6 wherein said first means includes a manually actuatable switch.

* * * * *